2,189,089

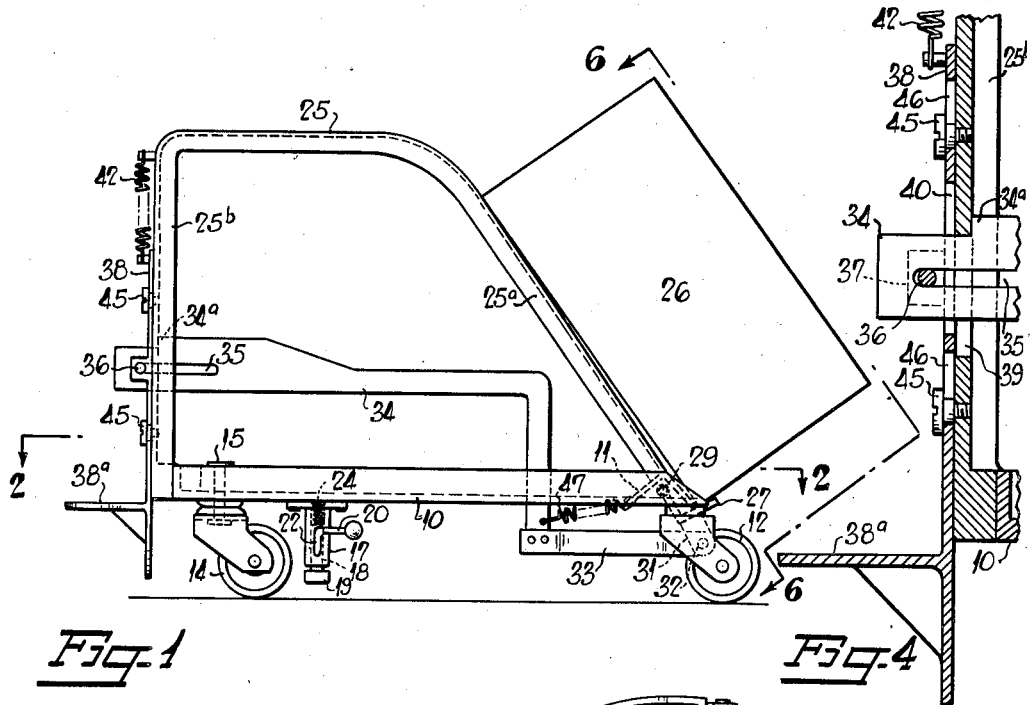
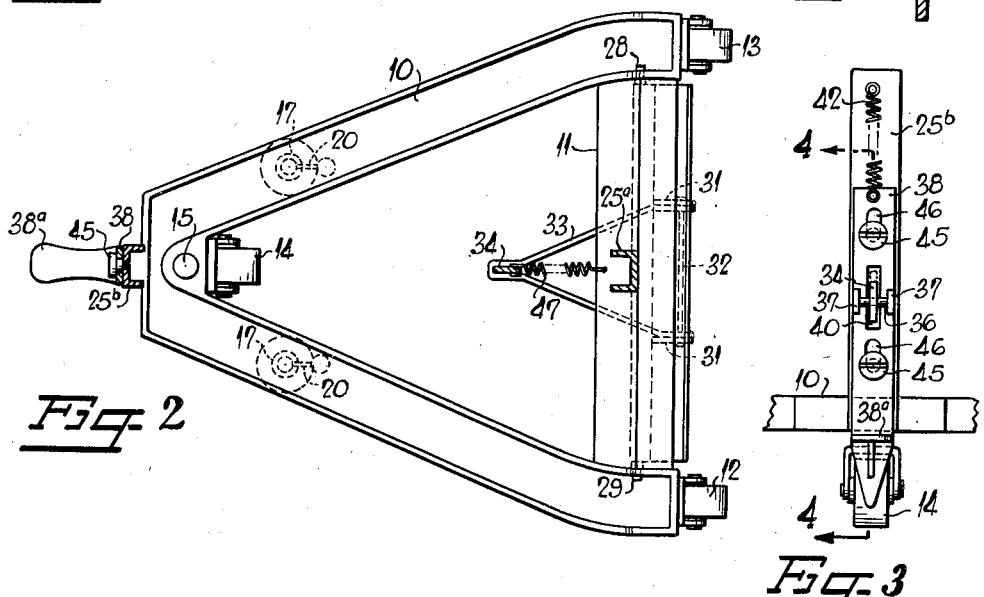
Feb. 6, 1940. W. W. TRIPP ET AL 2,189,089
TRUCK
Filed April 5, 1937 — 2 Sheets-Sheet 1
Inventors:
WEAVER W. TRIPP
AND
RUSSELL H. KALE
By Paul B. Eaton,
Attorney Feb. 6, 1940.    W. W. TRIPP ET AL    2,189,089
TRUCK
Filed April 5, 1937    2 Sheets-Sheet 2
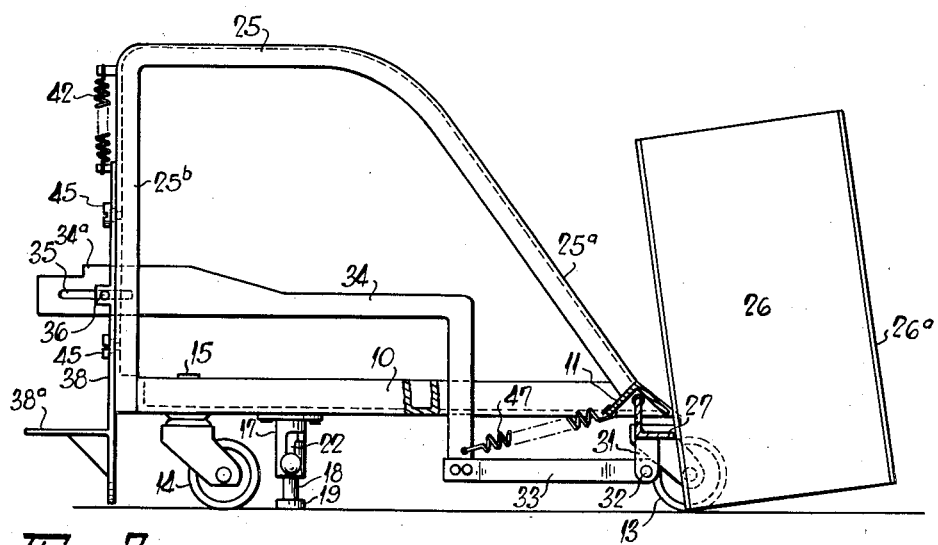
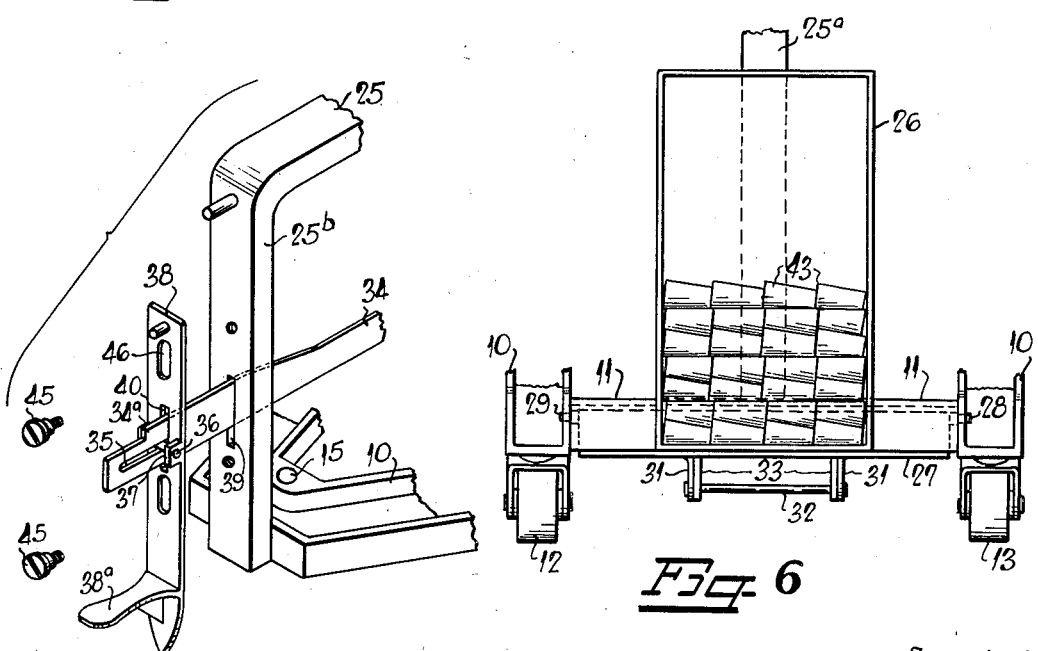
Inventors:
WEAVER W. TRIPP
AND
RUSSELL H. KALE
By Paul B. Eaton,
Attorney Patented Feb. 6, 1940

UNITED STATES PATENT OFFICE 2,189,089

TRUCK

Weaver W. Tripp and Russell H. Kale, Mebane, N. C.

Application April 5, 1937, Serial No. 135,015

1 Claim. (Cl. 280—49)

This invention relates to a truck for supporting boxes, containers, and the like, and more especially to one which supports the same while they are being filled. More particularly, the invention relates to a truck for supporting a box in an inclined position while the same is being filled with cones of yarn in a textile mill. It is a well known fact that when cones of yarn are removed from the spindles and placed in a container for shipment it is necessary to provide a movable support for the container so that the container may be moved from place to place as the cones of yarn are removed and packed. Where the container is supported with its sidewalls in a vertical position it is necessary for the workmen to stoop at a very great angle when placing the cones therein, thereby entailing a great deal of labor during the packing operation. The angular support for the container eliminates this extra labor and at the same time makes it possible to entirely fill the same while it is thus supported. After the box has been filled, it usually weighs several hundred pounds, and it is therefore necessary to provide a tipping mechanism for releasing the box from a truck so that it may be automatically placed upon the floor at a desired location, without the necessity of the weight of the box being manually lifted by the operators.

It is therefore, an object of this invention to provide a truck for supporting a container while the same is being filled, said truck having an inclined arch support for normally supporting the container in an inclined position so that it may be filled before closing the same and having means for releasing the supporting means for said container to allow the same to slide downwardly upon the floor after the container has been transported to the desired location. As the container strikes the floor the inertia stored in the falling container will cause it to assume an upright position, standing on end, due to the friction between the container and the floor on which it is deposited, as shown in Figure 7.

It is a further object of this invention to provide a truck of the class described, said truck having manually operated means secured thereto for causing the framework of the truck to frictionally engage the floor upon which it rests to prevent any relative movement between this truck and the floor while the container thereon is being filled.

Some of the objects of the invention having been stated, other objects will appear when taken in connection with the accompanying drawings in which—

Figure 1 is an elevation of the truck showing a container placed thereon in the position which it normally occupies while the same is being filled with cones of yarn;

Figure 2 is a sectional plan view taken along line 2—2 in Figure 1, omitting the container;

Figure 3 is an elevation looking at the left-hand portion of Figure 1;

Figure 4 is a vertical sectional view taken along the line 4—4 in Figure 3;

Figure 5 is an exploded isometric view of the left-hand portion of Figure 1 showing the tripping mechanism;

Figure 6 is a view taken along the line 6—6 in Figure 1, showing the manner in which cones of yarn are packed in the container, the cover being removed, and showing the container only partially filled with cones of yarn;

Figure 7 is an elevation, with portions thereof broken away, showing the position of the parts after the container has been filled and the tripping mechanism has been actuated to dump the filled and sealed container.

Referring more specifically to the drawings, the numeral 10 denotes a suitable forked framework which has secured to its diverging ends a transverse strut 11. The framework 10 is supported by non-swiveled wheels 12 and 13, and a swivel wheel 14, said swivel wheel being rotatably supported as at 15 beneath the rearmost end of framework 10. Secured to the lower side of the framework 10 is also a pair of flanged collars 17, each of which have slidably mounted therein a vertical shaft 18, said shaft having a head portion 19 integral with its lower end for engaging the floor when it is desired to place a breaking action upon the truck while its container is being packed full of cones. The shaft 18 has a pin 20 extending therefrom which penetrates an L-shaped slot 22 cut in the member 17. The pin 20 is used when it is desired to allow the members 18 or 19 to be lowered to a floor-engaging position as shown in Figure 7, under the force exerted by spring 24, which spring is disposed directly above the shaft 22. In order to operate the braking mechanism it is only necessary to turn the handle 20 horizontally in the L-shaped slot 22 until it falls in the vertical portion of said slot, after which the spring 24 will apply the necessary downward pressure upon members 18 and 19.

Resting upon the rearmost end of framework 10 and the transverse strut 11 is an arched lintel 25, the forward side 25a of said lintel being inclined at an angle and being adapted to support a suitable container 26 at substantially the same angle. The lower edge of container 26 is supported by one leg of pivoted angle member 27. This angle member has its ends pivotally supported as at 28 and 29 in the ends of the forked member 10. It will also be noted that the angle member 27 is disposed beneath the transverse strut 11 and in the position shown in Figure 1, one leg thereof projects a substantial distance beyond the strut 11 so as to form a projecting ledge for supporting the container. Projecting downwardly from pivoted angle member 27, are spaced projections 31 to which are pivoted, by means of rod 32, a second forked member 33, said forked member having the left-hand end thereof (Figures 1 and 2) rigidly secured to an L-shaped member 34. The extreme left-hand end of member 34 has a slot 35 therein in which is adapted to fit a pin 36 which pin has its ends fixed in suitable lugs 37 projecting outwardly from vertically disposed movable sliding plate 38.

By referring to Figure 5 it will be noted that end of member 34 penetrates a suitable slot 39 in the vertical rearmost portion 25b of lintel 25. The member 34 also penetrates a suitable slot 40 in the vertically disposed slide 38. This slide 38 is secured to the vertical portion 25a of lintel 25 by means of suitable spaced shoulder screws 45 said screws being adapted to penetrate slots 46 in the slide 38. When the angle 27 is supporting a container, the parts are in a latched position as shown in Figures 1 and 4, at which time a shoulder portion 34a on the end of L-shaped member 34 is normally engaging the upper portion of slot 39, which is cut in the portion 25a.

The left-hand end of member 34 is held in the latched positions as shown in Figures 1 and 4 by virtue of a suitable tension spring 42 which spring has its lower end attached to the upper portion of slide 38 and its upper end secured to the arch lintel 25. With the parts in latched position a container 26 is placed in an inclined position upon the angle 27 during which time packages of yarn such as 43 are placed within the open box. When the box has been completely filled, a suitable cover 26a is secured thereon and then it is transported to a suitable storage space where it is dumped. In order to effect this unloading or dumping operation pressure is applied to a suitable projection 38a which is integral with the slide 38, and the slide moves downwardly carrying with it the left-hand portion of the member 34. When this member has been lowered within the slot 39, to a point where the shoulder 34a will be disengaged from the upper portion of the notch the parts are caused to move to the position shown in Figure 7 by virtue of the weight of the box 26 itself as it slides to the floor. As the box strikes the floor, friction between the box and the floor will cause the box to move to vertical position, which position it is approaching in Figure 7. When the box has been removed from the truck, the parts will again assume normal latched position as shown in Figures 1 and 4, under tension of spring 47 which has one end thereof secured to member 34 and its other end secured to transverse struts 11.

It is therefore, seen that we have provided a truck for supporting a container in inclined position so that packages of yarn and the like, may be placed therein with the greatest of ease by the packers.

Also, means have been provided for easily unloading the container after it has been filled together with means for securing the framework in stationary position.

In yarn mills, the boxes in which the packages of yarn are packed are alined in rows parallel with the rows of winding and other yarn processing machines, with an aisle being left in front of and behind the boxes. In using the present invention, the trucks having the boxes thereon are placed in alined rows, and as a box becomes filled, the truck bearing the same can be backed from the row of trucks and rolled to the storage room and another truck can be inserted in lieu of the one removed, with an empty box thereon, so there is no interruption in the doffing operations being carried out on the machines. Backbreaking labor in the packing operation and heavy lifting of the filled boxes are both eliminated, and at the same time the speed of doffing is increased over the old methods.

The boxes are filled by placing the first layer to cover the bottom of the box and continuing to fill it with layers of cones parallel to the bottom, so that the center of gravity will always be to the left of a vertical line down through the lowermost corner of the box in Figure 1.

In the drawings and specification there has been set forth a preferred embodiment of the invention, and although specific terms are employed, they are used in a generic and descriptive sense only, and not for purposes of limitation, the scope of the invention being set forth in the appended claim.

We claim:

A wheeled truck having a triangular bottom portion, an upwardly and rearwardly inclined portion secured to the front end of said bottom portion, a member pivoted at its upper edge and having its lower portion projecting outwardly through the plane occupied by said inclined portion, a link pivoted at its forward end to said pivoted member, a projection on the rear end of said link, a sliding member for engaging said projection to prevent rearward movement of said link, tension means tending to move said sliding member upwardly, a pair of wheels disposed below the front end of said truck, and a swiveled wheel disposed below the rear end of said truck.

WEAVER W. TRIPP.
RUSSELL H. KALE.